(12) United States Patent
Bowman et al.

(10) Patent No.: US 9,594,839 B2
(45) Date of Patent: Mar. 14, 2017

(54) METHODS AND SYSTEMS FOR LOAD BALANCING DATABASES IN A CLOUD ENVIRONMENT

(71) Applicant: SYBASE, INC., Dublin, CA (US)

(72) Inventors: Ivan Thomas Bowman, Hammonds Plains (CA); Mumtaz Ahmad, Kitchener (CA)

(73) Assignee: SYBASE, INC., Dublin, CA (US)

( * ) Notice: Subject to any disclaimer, the term of this patent is extended or adjusted under 35 U.S.C. 154(b) by 282 days.

(21) Appl. No.: 14/580,087

(22) Filed: Dec. 22, 2014

(65) Prior Publication Data

US 2016/0179891 A1 Jun. 23, 2016

(51) Int. Cl.
*G06F 7/00* (2006.01)
*G06F 17/30* (2006.01)

(52) U.S. Cl.
CPC .. *G06F 17/30864* (2013.01); *G06F 17/30961* (2013.01)

(58) Field of Classification Search
CPC .............................................. G06F 17/30961
See application file for complete search history.

(56) References Cited

U.S. PATENT DOCUMENTS 8,892,569 B2 11/2014 Bowman et al.
2013/0318069 A1 11/2013 Alu et al.

OTHER PUBLICATIONS

Aboulnaga, Ashraf, "Cost Estimation Techniques for Database Systems—A Dissertation submitted in partial fulfillment of the requirements for the degree of Doctor of Philosophy in Computer Science", University of Wisconsin—Madison, (2002), 135 pgs.
Abouzour, Mohammed, et al., "Automatic Tuning of the Multiprogramming Level in Sybase SQL Anywhere", IEEE 26th International Conference on Data Engineering Workshops, (2010), 6 pgs.
Abouzour, Mohammed, et al., "Database Self-Management: Taming the Monster", IEEE, (2011), 1-9.
Ahmad, Mumtaz, et al., "Interaction-aware scheduling of report-generation workloads", The VLDB Journal 20, (2011), 589-615.
Ahmad, Mumtaz, et al., "Predicting System Performance for Multitenant Database Workloads", DBTest, (2011), 6 pgs.

(Continued)

*Primary Examiner* — Ajith Jacob
(74) *Attorney, Agent, or Firm* — Schwegman Lundberg & Woessner, P.A.

(57) ABSTRACT

Systems and methods are presented for load balancing databases in a cloud server environment. In some embodiments, a method can include accessing, by a server in a network-based system, one or more system configuration parameters of the network-based system, with the one or more system configuration parameters defining one or more performance capabilities of the network-based system. The method may also include accessing performance characteristics of a query of a queried database; generating a quadtree decomposition, with the quadtree decomposition modeling a cost estimate of the database query as a function of a range of the performance capabilities of the one or more system configuration parameters; and generating a proposed packing of databases based on the modeled cost estimate of the query including the queried database and defining a configuration of a plurality of databases to be stored in the server.

18 Claims, 9 Drawing Sheets

(56) References Cited

OTHER PUBLICATIONS

Ahmad, Mumtaz, "Query Interactions in Database Systems—A thesis presented to the University of Waterloo in fulfillment of the thesis requirement for the degree of Doctor of Philsophy in Computer Science", Waterloo, Ontario, Canada, (2014), 139 pgs.

Aluc, Gunes, et al., "Parametric Plan Caching Using Density-Based Clustering", IEEE 28th International Conference on Data Entering, (2012), 402-413.

Bizarro, Pedro, et al., "Progressive Parametric Query Optimization", IEEE Transactions on Knowledge and Data Engineering, vol. 21, No. 4, (Apr. 2009), 582-594.

Bowman, Ivan, et al., "SQL Anywhere: An Embeddable DBMS", IEEE, (2007), 1-8.

Chaudhuri, Surajit, et al., "Variance Aware Optimization of Parameterized Queries", SIGMOD, (2010), 531-542.

Curino, Carlo, et al., "Workload-Aware Database Monitoring and Consolidation", SIGMOD, (2011), 313-324.

Duggan, Jennie, et al., "Performance Prediction for Concurrent Database Workloads", SIGMOD, (2011), 337-348.

Elmore, Aaron, et al., "Characterizing Tenant Behavior for Placement and Crisis Mitigation in Multitenant DBMS", SIGMOD, (2013), 517-528.

Elmore, Aaron, "Elasticity Primitives for Database as a Service—A Dissertation submitted on partial satisfaction of the requirements for the degree of Doctor Philosophy in Computter Science", University of California—Santa Barbara, (Mar. 2014), 160 pgs.

Ghodsnia, Pedram, et al., "Parallel I/O Aware Query Optimization", SIGMOD, (2014), 349-360.

Ioannidis, Yannis, et al., "Parametric Query Optimization", Proceedings of the 18th VLDB Conference, (1992), 103-114.

Mahmoud, Hatem, et al., "CloudOptimizer: Multi-tenancy for I/O-Bound OLAP Workloads", ED BT/I/CDT, (2013), 77-88.

Nica, Anisoara, et al., "Using Similarity Distance for Performance Prediction of the Query Optimization Process", DBTest, (2013), 6 pgs.

Reddy, Naveen, et al., "Analyzing Plan Diagrams of Database Query Optimizers", Proceedings of the 31st VLDB Conference, (2005), 1228-1239.

Schaffner, Jan, et al., "RTB: Robust Tenant Placement for Elastic In-Memory Database Clusters", SIGMOD, (2013), 773-784.

Sheikh, Muhammad, et al., "Bayesian Approach", ICAC, (2011), 121-130.

Soror, Ahmed, et al., "Automatic Virtual Machine Configuration for Database Workloads", ACM Transactions on Database Systems, vol. 35, Article 7, (Feb. 2010), 1-47.

Weikum, Gerhard, et al., "Self-tuning Database Technology and Information Services: from Wishful Thinking to Viable Engineering", Proceedings of the 28th VLDB Conference, (2002), 12 pgs.

METHODS AND SYSTEMS FOR LOAD BALANCING DATABASES IN A CLOUD ENVIRONMENT

TECHNICAL FIELD

The subject matter disclosed herein generally relates to the processing of data in a cloud environment. In some example embodiments, the present disclosures relate to methods and systems for load balancing databases.

BRIEF DESCRIPTION OF THE DRAWINGS

Some embodiments are illustrated by way of example and not limitation in the figures of the accompanying drawings.

DETAILED DESCRIPTION

Figure 1:
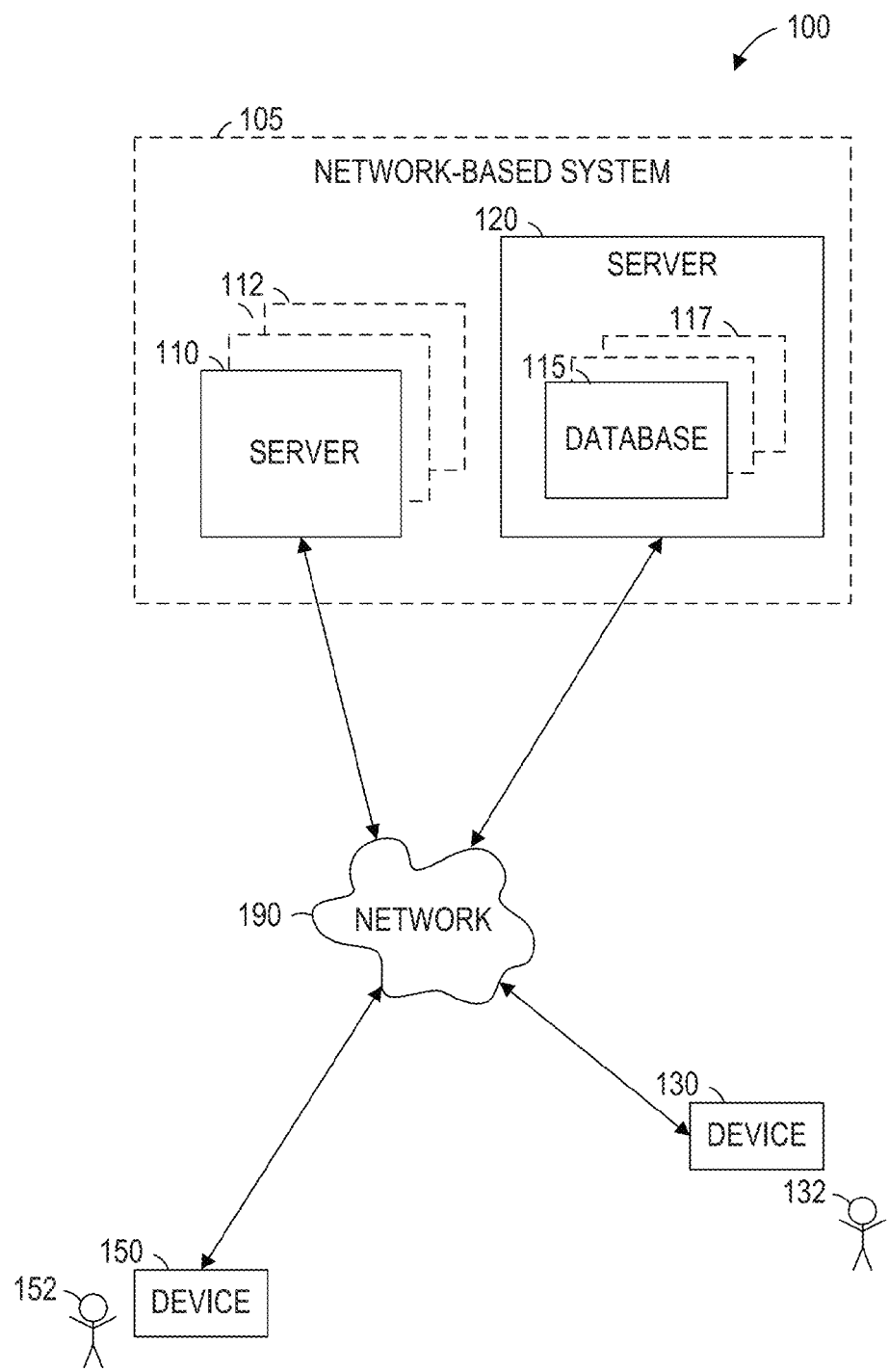
FIG. 1 is a network diagram illustrating a network environment suitable for performing load balancing of multiple databases in a cloud environment, according to some example embodiments.

Example methods, apparatuses, and systems are presented for load balancing databases in a cloud server environment.

When operating databases in the cloud server environment, various resources are shared when multiple databases are run on a single host or server. In this way, resource costs may be reduced as there is less waste of unused resources. A number of strategic objectives may be taken into consideration when trying to reduce resource costs. For example, it is desirable to provide reasonable performance to client applications when connecting to databases hosted in the cloud environment while balancing resource usage. When multiple databases are running on a single machine, e.g., a server, the workload at the server is the combination of the workloads for the individual databases. These workloads may interact in a non-linear manner, making it hard to predict performance of hypothetical distributions. Nevertheless, it is important to choose how many physical machines will be used and how databases (and read-only replicas of these) will be distributed to physical machines in order to provide acceptable performance levels while minimizing hardware, licensing, and other resource costs.

In addition, it is desirable to support configurations where only a subset of databases are used at a time. In this model, a host, e.g., a server in the cloud environment, has many databases that are in a stopped state (e.g., consuming no central processing unit (CPU), memory, or network resources) and only a few running databases. These situations arise when individual databases are referenced infrequently or for only a short time.

Moreover, it is desirable to provide location independence to client applications, meaning that the client or user may not know the physical location of the client application or the database, e.g., where in the memory and on what server the client application or the database resides. Tracking the current physical location of each database and starting the database if it is not running would be inconvenient for client applications. Instead, a redirection capability can connect a client to a server with the database and start running the database if it is stopped. When choosing a server for a read-only connection, an appropriate replica may be selected to balance the load among the hosts in the cloud.

Taking into account the above considerations, it is desirable to predict the performance of a mix of databases running on a physical machine in order to determine suitable allocations of databases to servers. The assigning of database applications to particular servers based on balancing resource costs across each server is sometimes called load balancing. Some techniques for performing load balancing include relying on historical data that show what resource costs have been used by database applications at particular times of day, and then performing load balancing based on the historical data. However, this approach fails in at least several different scenarios. For example, relying on historical data does not work when no historical data exists, such as when performing load balancing for the first time on new databases or in a new cloud server environment. As another example, historical data may not reliably predict present performance due to changing customers or customer needs.

To perform load balancing in at least these cases, new approaches are desired. In general, it may be desirable to provision the cloud server environment to load a particular configuration of databases—sometimes called a packing—never before tried, and to have a prospective analysis as to how well-balanced this initial packing will be. In addition, it may also be desirable to determine whether a particular packing satisfies one or more service-level objectives (SLOs) (e.g., performance objectives specified by a server company hosting the cloud server environment).

Simplistic approaches may include merely tabulating the resource demands of each database application, adding them up, and then balancing the database applications to the servers based on resource capacity of each server. However, this simple approach does not account for a number of factors, including a measure of adaptivity of the servers and a level of interaction between and within the servers. Adaptivity refers to the concept of how database servers may be configured to adapt, change, or reallocate resources internally based on the load in the server. In other words, depending on how resources are allocated and what the resource needs are, the servers may change dynamically. Interaction refers to how database workloads interact when two or more databases are running simultaneously. In other words, while a first database and a second database may perform a certain way on their own, their performances may change when running simultaneously due to their resource interactions.

The performance of any load balancing scheme depends at least in part on characteristics of the host server, such as the following: 1) number of processor cores and the clock rate; 2) operating system and software versions; 3) total physical memory; and 4) storage system costs. In addition, the system characteristics of the host server are affected by the workload of the databases located at the host. The workload can be characterized by several different factors, including for example: 1) average number of threads active (e.g., how much parallelism can be used in a plan); 2) amount of query memory in use (e.g., how much memory is likely to be available for hash and sort operations); 3) I/O queue depths (e.g., how much benefit will prefetching give for overlapping CPU and I/O costs); and 4) contents of the buffer pool.

These dependencies mean that predictions of the resource consumption of a packing will be erroneous if based on observations of each database in isolation. For example, two databases A and B may appear to be compatible when run in isolation, with A using little CPU but heavy disk and B using the opposite. When run together, though, the query plans may change in a way that causes unexpected conflicts. It is important to consider plan variance due to server adaptation when predicting whether a packing is feasible.

Moreover, the initial placement problem (developing an initial packing for a server or set of servers) may not be a one-time problem, as a load distributor may need to evaluate candidate packings without sufficient historical information. Thus, it is desirable to estimate the resource demands of a candidate packing in order to estimate whether the packing is feasible, particularly when historical data is not available.

Methods and systems are presented for load balancing one or more servers in a cloud environment that may address one or more of the issues described herein. In some example embodiments, a model is constructed that can estimate the resource consumption of a database query under a specific system state, and use the model to estimate the resource consumption of a packing of databases in the specific system state. Given a set of candidate system states, these estimates can be used to predict the maximal resource consumption. Based on the predicted resource consumption, one or more packings may be generated that efficiently utilize the system resources. In some example embodiments, the SLOs are compared against the proposed packings. If one or more of the SLOs are not satisfied, then the packing is considered not feasible, and the method reiterates until all SLOs are satisfied. In some example embodiments, a packing may be acceptable if the SLOs are satisfied in at least a predetermined percentage of queries (for example, if a particular SLO is satisfied in 90% of database queries).

FIG. 1 is a network diagram illustrating a network environment 100 suitable for performing load balancing of multiple databases in a cloud environment, according to some example embodiments. The network environment 100 includes a network-based system 105, containing a plurality of servers communicatively coupled to each other and accessible to multiple users, e.g., users 132 and 152, via a network 190. The network-based system 105 may be accessed by a user, such as user 132, with device 130, through server 110. Multiple servers 112 may also be present in the network-based system 105. As another example, server 120 may also be present in the network-based system 105. By way of illustration, server 120 may include multiple databases, including database 115 and other databases 117. Server 110 and additional servers 112 may also include one or more databases, not shown. The multiple servers, e.g., server 110, server 120, and additional servers 112, may form all or part of the network-based system 105 (e.g., a cloud-based server system configured to provide one or more services to the devices 130 and 150). The plurality of servers 110, 112, and 120 and the devices 130 and 150 may each be implemented in a computer system, in whole or in part, as described below with respect to FIG. 9.

Also shown in FIG. 1 are users 132 and 152. One or both of the users 132 and 152 may be a human user, a machine user (e.g., a computer configured by a software program to interact with the device 130), or any suitable combination thereof (e.g., a human assisted by a machine or a machine supervised by a human). The user 132 may not be part of the network environment 100, but may be associated with the device 130 and may be a user of the device 130. For example, the device 130 may be a desktop computer, a vehicle computer, a tablet computer, a navigational device, a portable media device, a smartphone, or a wearable device (e.g., a smart watch or smart glasses) belonging to the user 132. Likewise, the user 152 may not be part of the network environment 100, but may be associated with the device 150. As an example, the device 150 may be a desktop computer, a vehicle computer, a tablet computer, a navigational device, a portable media device, a smartphone, or a wearable device (e.g., a smart watch or smart glasses) belonging to the user 152.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 9. As used herein, a "database" refers to a data storage resource and may store data structured as a text file, a table, a spreadsheet, a relational database (e.g., an object-relational database), a triple store, a hierarchical data store, any other suitable means for organizing and storing data or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases, and devices (e.g., the server 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include, for example, one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMax network), or any suitable combination thereof. Any one or more portions of the network 190 may communicate information via a transmission medium. As used herein, "transmission medium" may refer to any intangible (e.g., transitory) medium that is capable of communicating (e.g., transmitting) instructions for execution by a machine (e.g., by one or more processors of such a machine), and can include digital or analog communication signals or other intangible media to facilitate communication of such software.

Figure 2:
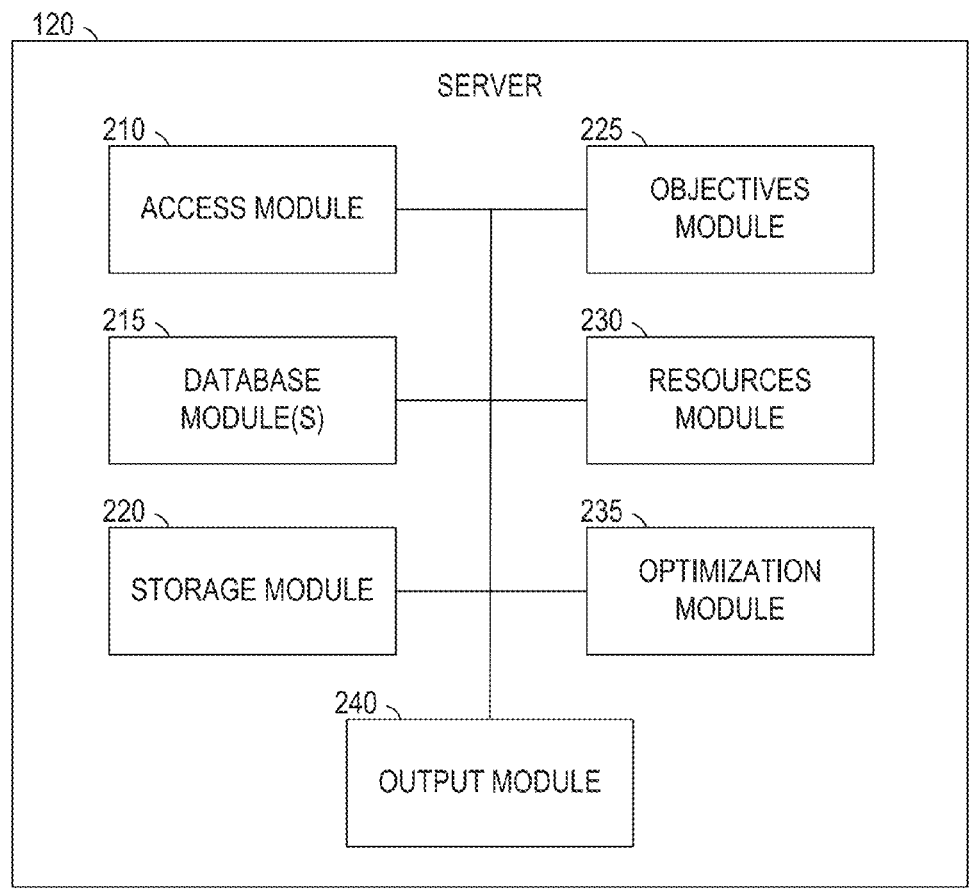
FIG. 2 is a block diagram illustrating components of a server configured to perform load balancing, according to some example embodiments.

FIG. 2 is a block diagram illustrating components of the server 120 configured to perform load balancing, according to some example embodiments. The server 120 is shown as including an access module 210, one or more database modules 215, a storage module 220, an objectives module 225, a resources module 230, an optimization module 235, and an output module 240, all configured to communicate with each other (e.g., via a bus, shared memory, or a switch). Any one or more of the modules and databases described herein may be implemented using hardware (e.g., one or more processors of a machine) or a combination of hardware and software. For example, any module or database described herein may configure a processor (e.g., among one or more processors of a machine) to perform the operations described herein for that module or database. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The access module 210 may be configured to access inputs from an external source, such as requests to access a database from the user 132. The one or more database modules 215 may be configured to store one or more databases accessible to clients, such as the user 132. Each of the databases in the one or more database modules 215 may possess different characteristics or properties, in the sense that the different databases may demand different amounts of machine resources when running and may be run at different times. The storage module 220 may be configured to store other programs and information in the server 120 separate from the information stored in the database modules 215. Examples can include one or more operating systems of the server 120, optimization programs, resource monitors, diagnostic programs, and so on. The objectives module 225 may be configured to access and interpret the one or more SLOs that may be desired to be satisfied by the load balancing methods of the present disclosures. The SLOs may be specified by a server manager in control of the server 120, which may be accessed by the access module 210 and stored by the storage module 220. The resources module 230 may be configured to access specifications for amounts and types of resources that may be consumed by each database in the one or more database modules 215. In some example embodiments, the resources module 230 is configured to measure the amount and type of resources used by each database. In some other example embodiments, the resources module 230 accesses this information from the storage module 220.

The optimization module 235 may be configured to generate a packing of databases that efficiently utilizes the resources available in the server 120, based on the resource needs of queries to each of the databases. In some example embodiments, the optimization module 235 is configured to also account for the adaptivity and interaction problems present when generating a packing of databases, rather than merely considering the resource needs of each database in isolation. In some example embodiments, the optimization module 235 is also configured to generate a packing that satisfies the SLOs. The optimization module 235 may access relevant information from the objectives module 225, the resources module 230, the storage module 220, and the one or more database modules 215 in order to generate a satisfactory packing.

The output module 240 may be configured to display or otherwise present the proposed packing from the optimization module 235 to a system manager or administrator of the server 120. Alternatively or additionally, the output module 240 may be configured to display or otherwise present the various SLOs and the various descriptions of resources consumed by the databases.

In some example embodiments, the following definitions and objectives are considered for performing load balancing. For example, let $\mathbb{H}$ be the set of hosts available in a cloud environment and $\mathbb{D}$ the set of databases. A packing P is defined as a candidate assignment of a set of databases $D \subseteq \mathbb{D}$ to a host H. $\mathbb{P} = 2^{\mathbb{D}} \times \mathbb{H}$ may be used as the set of all possible packings, where $2^{\mathbb{D}}$ is the power set of $\mathbb{D}$. For each packing P in $\mathbb{P}$, $P=(P_D, P_H)$: $P_D \subseteq \mathbb{D}$, $P_H \in \mathbb{H}$. In order to assist an administrator of the cloud environment, distinct subsets may be identified as $\mathbb{P} = \mathbb{P}_{good} \cup \mathbb{P}_{under} \cup \mathbb{P}_{bad}$ characterizing a candidate packing $P \in \mathbb{P}$ as either good (e.g., expected to meet SLOs), under (e.g., meets SLOs but under-utilizes resources), or bad (e.g., violates SLOs) where $\mathbb{G} = \{good, bad, under\}$. An objective of the present disclosure is to generate in a cloud environment a packing of databases based on a packing-goodness function $\mathcal{G}: \mathbb{P} \to \mathbb{G}$ that estimates the goodness of a proposed packing $P \in \mathbb{P}$. This packing-goodness function can be used on its own as a colocation advisor that assists human administrators or it could be included as part of a more comprehensive consolidation engine that distributes databases among hosts in order to minimize operational costs while meeting SLOs.

In some example embodiments, estimating the goodness of a packing $\mathcal{G}(P)$ involves predictions about the interactions between the workloads of the databases $D \in P_D$. In some environments, it is possible to limit complex interactions, for example by using isolated buffer pools and separate I/O devices for each database.

However, in general, interactions between databases can be quite complex, especially when a shared buffer pool is used between databases. One approach is to classify hosts and databases into a small number of classes $\hat{\mathbb{H}}$ of hosts and $\hat{\mathbb{D}}$ of databases. The classification may be defined by $c_{\mathbb{D}}: \mathbb{D} \to \hat{\mathbb{D}}$ and $C_{\mathbb{H}}: \mathbb{H} \to \hat{\mathbb{H}}$. The classification functions are defined so that all of the databases within one class are expected to behave similarly both in isolation and in their interactions with other databases, and the behavior of a particular packing is expected to be the same for all hosts within one particular class. If the classifier $c_{\mathbb{D}}(D)$ is applied to a set D of distinct databases, the result is a multi-set of $\hat{\mathbb{D}}$ elements. The multiset may be represented as a packing vector in $\mathbb{N}^{|\hat{\mathbb{D}}|}$ where there is a non-negative count associated with each of the classes of databases. Once these classifiers are learned, a packing classifier $C_{\mathbb{P}}: \mathbb{P} \to \hat{\mathbb{P}}$ may be defined where $\hat{\mathbb{P}} = \mathbb{N}^{|\hat{\mathbb{D}}|} \times \hat{\mathbb{H}}$ represents the count vector of the database classes assigned to host in the specified host class.

In some example embodiments, the goodness function $\mathcal{G}$ can be approximated using $\hat{\mathcal{G}}: \hat{\mathbb{P}} \to \mathbb{G}$ as $\mathcal{G}(P) := \hat{\mathcal{G}}(C_{\mathbb{P}}(P))$. In this approach, observations of past packings may be used to estimate $\hat{\mathcal{G}}$. This approach can give satisfactory predictions provided that two conditions are met: a) there exists a sufficiently long and rich training period that has observed all distinct packings of interest $C_{\mathbb{P}}(P)$ and b) the classifier functions $c_{\mathbb{D}}$ and $C_{\mathbb{H}}$ assign classes to databases in a way that accurately models their behavior independently and in colocation with other tenant databases.

However, there is a tension between these two conditions; having fewer classes of databases allows a shorter training interval to be broadly useful, but fewer database classes reduces the precision for representing the types of database interactions.

Aspects of the present disclosure are presented to help with both of these conditions. Methods and systems of the present disclosure can make predictions when there is insufficient natural history and to better inform the classification of databases into equivalence classes that behave in similar ways.

Figure 3:
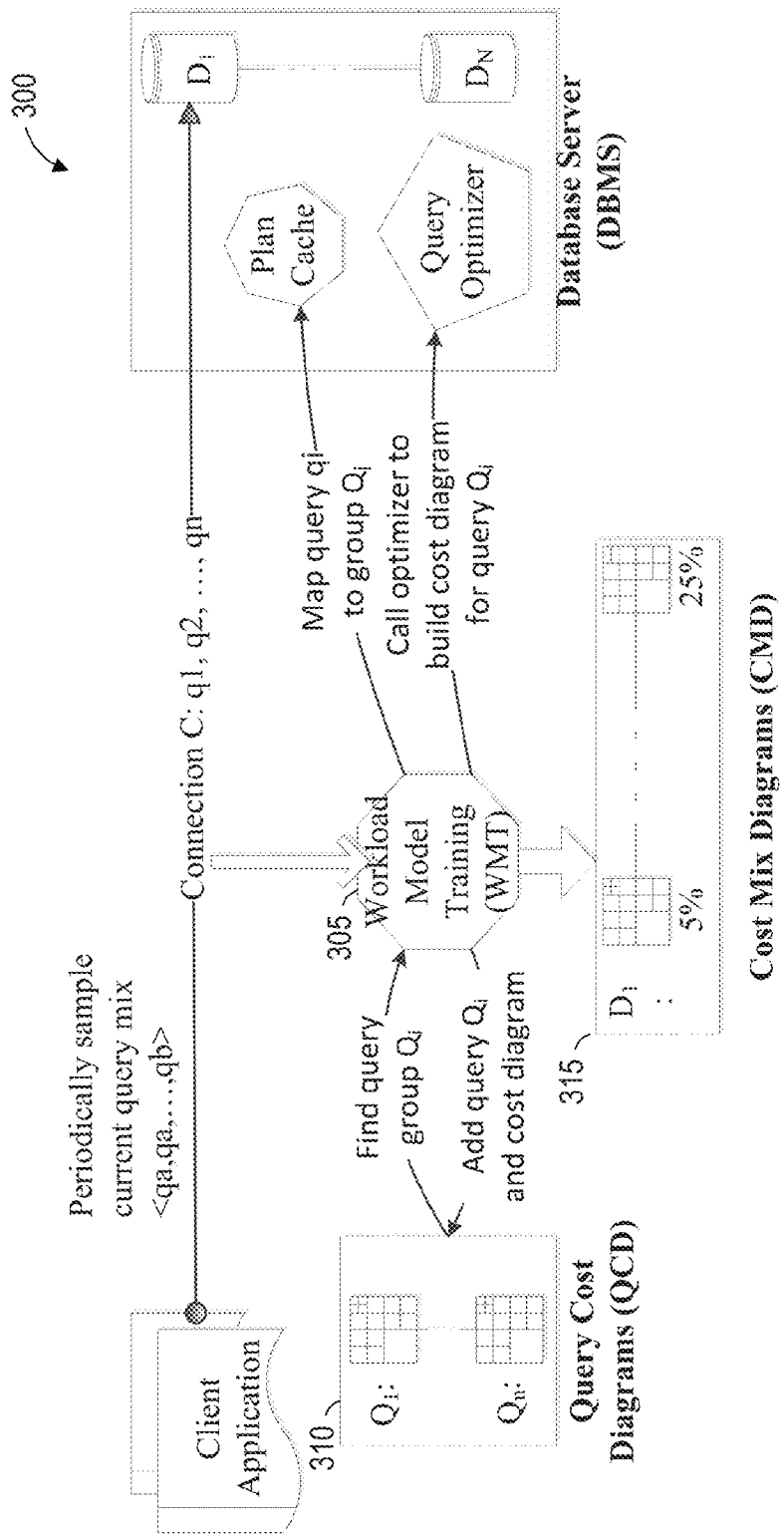
FIG. 3 is a more detailed block diagram illustrating components of a system for performing load balancing, according to some example embodiments.

FIG. 3 is a more detailed block diagram illustrating components of a system 300 for performing load balancing, according to some example embodiments. Here, a Workload Model Training (WMT) 305 component may periodically monitor a query mix $M = \langle q_1, q_2, \ldots, q_n \rangle$ for each database on a server (e.g., server 120). The mix can be a multiset that can have duplicates. The WMT may be part of the optimization module 235. In some example embodiments, the WMT 305 maps each query $q_i$ in the mix to a query group $Q_j$, where $Q_j$ is expected to have the same execution plan as $q_i$ in every possible system configuration. If the WMT 305 has not previously observed $Q_j$, the WMT 305 may make multiple calls to the optimization module 235 to generate a Query Cost Diagram (QCD) 310 that summarizes the optimization module's 235 estimated costs for $Q_j$ in all regions of the system configuration. If the WMT 305 has previously observed $Q_j$ then it retrieves the QCD 310 from its summary structure.

In some example embodiments, the WMT 305 uses the query mix M and the retrieved QCDs 310 to update a Mix Cost Diagram (MCD) 315 for each database. The MCD 315 may be an output of the WMT 305, and may be displayed by the output module 240. The MCD 315 may summarize the various mix costs observed for the database and assign a probability for each mix. Each mix cost represents a combined cost estimate that considers all of the queries in a query mix. In some example embodiments, when predicting the goodness of a packing of databases to hosts, the mix cost diagrams of the individual databases may be combined according to their observed frequency distribution.

Self-managing database systems adapt to the load by changing execution plans and configurations to give the best expected performance for the current configuration. These may dramatically alter the query execution plan and shift resource demands, e.g., between CPU and I/O.

The following are system parameters that could affect the choice of query execution plan:

Query Multi-Programming Level (MPL).

Parallel query execution allows multiple CPU cores to work on a single query to reduce response time. When there are, on average, more active queries, each query is less likely to get extra CPU resources for parallel query execution; the optimization module 235 might therefore choose a non-parallel plan that, for example, uses more disk I/O. Self-managing systems may adjust the server multi-programming level, and this may affect how many threads are available for each query.

Query Memory (QM).

Query memory is an important resource for processing operations such as sorting, grouping, and joins. The database server, e.g., server 120, may be responsible for allocating query memory among concurrent requests. The optimization module 235 may use a memory governor that grants query memory (used for hash and sort operations) asymmetrically based in part on the expected number of active memory intensive requests. When only one query is running in isolation, the query may be allocated a larger share of query memory than it would when running concurrently with other memory-intensive queries. If the number of concurrent memory-intensive queries reaches a configured limit, then later requests may be queued until memory is released. The optimization module 235 may estimate the query memory that is likely to be granted at execution time. In some cases, a sort or hash operation might be selected in isolation where a strategy with modest memory requirements is used in a mix where less memory is available.

Available Buffer Pool Size (BPS).

The optimization module 235 may be configured to estimate how likely it is for pages that a query requests multiple times to be satisfied by the buffer pool. For example, with a nested loop join there may be a query that reads the right-hand-side (RHS) pages from disk at most once in isolation but multiple times when there are concurrent queries competing for page positions in the buffer pool.

Prefetch Length (PF).

Prefetching data is an effective way to overlap the cost of disk I/O with other processing and can benefit sequential scans, index scans, and the merge phase of external sort. On some hardware devices (e.g., a redundant array of inexpensive disks (RAID) and solid state drives (SSDs)) total throughput improves with a higher queue depth. When a query is executed in isolation, it may select an execution plan expecting to be able to use aggressive prefetching to get a lower total time. When run in combination with other concurrent queries, the optimization module 235 may account for the action to share the storage device by predicting that less aggressive prefetching will be used at execution, and this may lead another plan to be estimated as cheaper in that environment.

Buffer Pool Contents (MR).

The optimization module 235 may monitor how many pages of each table and index are expected to be in the buffer pool based on the history of the current server process. When the optimization module 235 estimates the cost of an execution plan, it may use estimates of the current buffer pool contents to predict how many I/O requests will be satisfied by a cache hit. In isolation, a single database may enter a stable state where most of the working set of the workload is in the buffer pool and there are few cache misses. When running in a mix with other databases, it is possible for pages to be evicted as a consequence of activity on other databases.

CPU Cost of Operations.

The cost of low-level operations may vary between platforms due to differences in hardware, operating system software, or the compiler or profile-guided optimizations used for a particular host. The optimization module 235 may estimate the CPU cost of low-level operations using calibration (e.g., defaulting to a single value unless a system administrator has calibrated the cost model). Table 1 shows an example set of CPU parameters used by the optimization module 235, according to some example embodiments.

TABLE 1

Calibrated CPU Costs

| Parameter | Description |
| --- | --- |
| RowMarshalCost | Time to read a row from disk (page) format to memory |
| RowAccessCost | Time to start reading or writing a row (without changing formats) |
| SortCpuCostPerComparison | Time for a single key comparison during sorting |

TABLE 1-continued

Calibrated CPU Costs

| Parameter | Description |
|---|---|
| SortNCpuCostPerRow | Time for processing a row in a top-N sort using a priority queue |
| DistCpuCostPerRow | Cost per input row for removing duplicates from sorted input |
| HashCostPerRow | Cost per key lookup in hash table (during build or probe) |
| HashCostPerKey | Cost per unique key inserted into hash table |
| HashBuildCostPerRow | Cost per row copied into the hash table |
| ExchangeStartupCost | Overhead of starting a parallel acess plan |
| ExchangePerRowCost | Cost per row of coordinating result rows in a parallel plan |

Disk Transfer Time (DTT).

For large data sets, the cost of reading data from permanent storage can be a dominant cost. The behavior of storage systems can vary widely for bandwidth and latency in processing sequential or random requests (e.g., compare the difference between hard drives, SSDs, and storage area networks). The optimization module 235 may use a calibrated model that estimates the cost of I/O based on a) the band size, which is the average file distance between consecutive reads and b) the prefetching degree. In addition, the optimization module 235 may calibrate the benefit of scatter reads (e.g., used for prefetching larger blocks during sequential scans) and the incremental benefit of using large (e.g., up to 16 MB) block I/O for prefetching during the run merging step of sorting.

While the optimization module 235 may consider the current system state when selecting an execution plan, it may also use hysteresis policies that estimate longer term behavior and are not overly influenced by the immediately preceding state.

In some example embodiments, the optimization module 235 may select an execution plan for a query. As part of its implementation, in some example embodiments, the optimization module 235 may compute, and can return, estimates of how the plan will behave, including the following:

Number of I/O.

This represents the total number of reads or writes used for base tables, indexes, or intermediate temporary storage. This includes pages modified by data manipulation language (DML) operations. If necessary, the reads and writes can be estimated separately from each other for each attached storage device.

I/O Busy Time.

This represents the time that each I/O device is busy processing an operation for the query plan. Again, this can be separated into components if needed.

CPU Time.

This represents the time across all CPUs spent processing the plan.

Query Memory.

This represents the estimated memory that will be used by the query for sort or hash-based query operations.

Resource Consumption.

This represents the total cost of executing the plan, normalized to the number of seconds each affected resource is busy and unavailable for other plans.

Response Time.

This represents the time (e.g., in seconds) that a server, e.g., server 120, is busy processing the request. Since different resources are used concurrently, this can be lower than resource consumption but it is at least as large as the time spent for the most expensive individual resource (for example, a single CPU thread or a single storage device).

In some example embodiments, the access module 210 may be configured to allow the user 132 to specify any of the system parameters described herein, and the optimization module 235 may return a vector with the above cost estimates. In some example embodiments, the optimization module 235 may provide a cost estimate based on user specified system parameters and without more information.

However, in other cases, the cost model may need to be calibrated and the resulting estimates normalized. Although in some cases the optimization module 235 provides its own calibration procedure and normalizes the cost estimates to a common time unit, e.g., seconds, another problem may still persist. One goal of a system for load balancing is to select a reasonable plan within a reasonable optimization time. Estimation errors may be inevitable in this environment, and the errors compound with query complexity. These errors may be a concern when using the estimates in other contexts.

Moreover, there may be other associated costs with load-balancing techniques used in industry. For example, there may be non-negligible overhead costs for performing typical load-balancing techniques as the techniques may include costs to parse and build the selected plan. For example, each call can take on the order of a millisecond.

However, aspects of the present disclosure may employ an approach using a quadtree approximation of the behavior of the optimization module 235 to address some of these issues. In some example embodiments, the quadtree subdivides the space of system parameter values, with more subdivisions in regions where there is more complexity in the adaptive behavior of the optimization module 235. For example, a FARQ may be used to approximate the query plans across the space of system parameters.

Defining FARQ for Load Balancing

The quadtree is a data structure used for geometry and spatial operations. A quadtree structure progressively subdivides the input so that there are more subdivisions in the regions of space where there is more variation.

Figure 4:
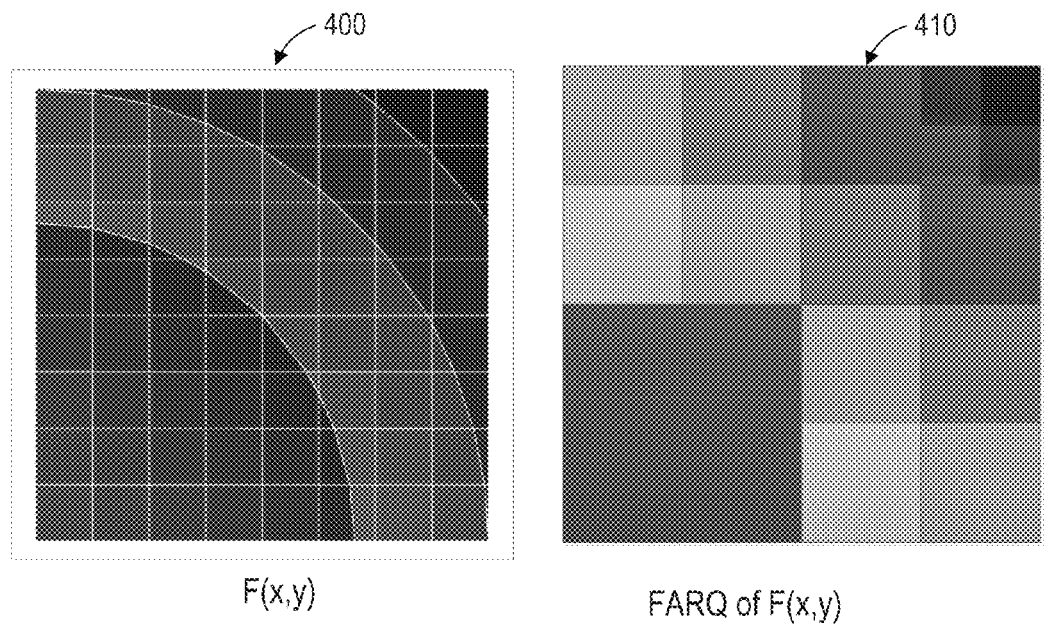
FIG. 4 shows two illustrations of a function as a contour using quadtree decomposition, according to some example embodiments.

For example, consider the function $F(x,y)=x^2+y^2$. FIG. 4 shows this function as a contour in illustration 400, and an approximation of the function using a region quadtree, as shown in illustration 410. Note that there are more subdivisions in the upper-right of the quadtree as it adapts to represent the faster changes in the function.

Similarly, a FARQ is defined as a tree that approximates a function (F) that maps the unit square to a range set Y. In some example embodiments, the FARQ may be applied to a square of arbitrary dimensions, that is, a hypercube h of arbitrary dimension d. In order to form the approximation, it is determined whether a particular region h can be adequately represented by a single estimate (e.g., given by EsT(h)) or if it needs to be further decomposed: a SHOULD DECOMPOSE (h) function may be provided to encapsulate this decision. While described for a function of a unit square, the extension of the approach to d dimensions is straightforward. The following algorithm in Table 2, according to some example embodiments, builds a FARQ for the provided function $F:[0,1]^d \to Y$ given appropriate definitions of Est(h) and ShouldDecompose(h).

TABLE 2

Computing FARQ

```
FARQ(h)
1        ▷ Compute FARQ sub-tree for hypercube h
2        if SHOULDDECOMPOSE(h)
3            for i ∈ [1,2^d]:
4                h_i ← sub-cube i of h
5                c_i ← FARQ(h_i)
6            return SUBTREE(⟨c_1, c_2, ... , c_2d⟩)
7        else
8            return LEAF(EST(h))
```

Table 2 shows an example algorithm to build a FARQ for a sub-region of the input. The FARQ is a tree where leaf nodes contain an estimate for a region and internal nodes represent regions that are decomposed to provide estimates for their sub-regions.

Figure 5:
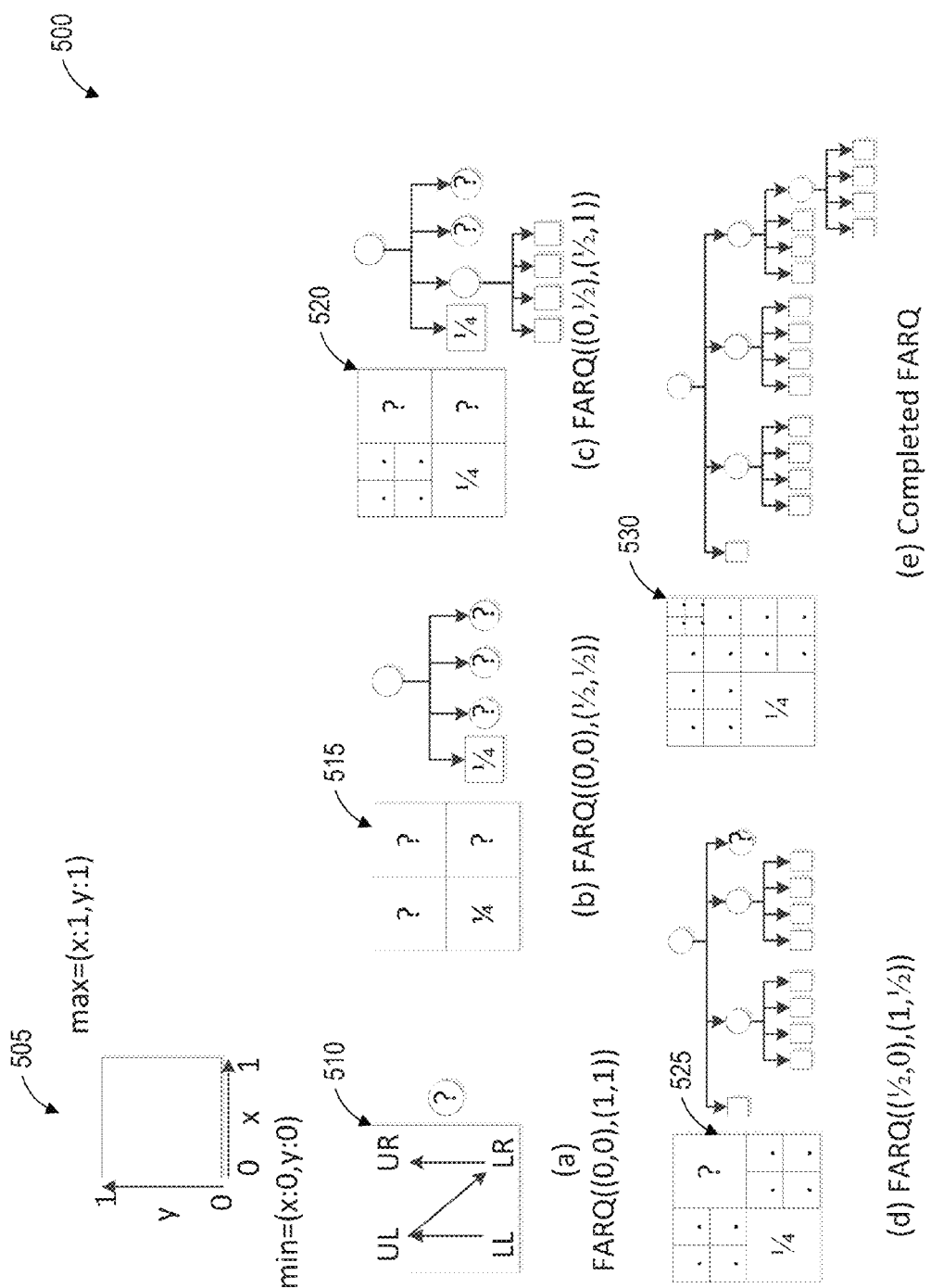
FIG. 5 illustrates an example of building a function approximation region quadtree (FARQ), according to some example embodiments.

FIG. 5 illustrates an example 500 of building a FARQ, according to some example embodiments. In this example, the Morton N ordering is used. That is, the ordering involves visiting the lower-left square, then upper-left, then lower-right, then upper right. The example starts by determining whether the entire region can be estimated by a single value (it cannot), then recursively processing the sub-regions until they do not need to be decomposed and can be represented as a leaf node with an estimate. The example progresses through step 505, then step 510, then step 515, step 520, step 525, and finishes with step 530. As can be seen, if a specific region cannot be estimated by a single value, then said region is subdivided into sub-regions until each of the sub-regions is determined to be estimated by a single value. Illustration 500 shows how the unit square is subdivided into a FARQ based on the function $F(x,y)=x^2+y^2$. The output may be a graphical representation of the unit square, shown either as a display of the square with resulting sub-regions, or as a tree with sub-nodes, as shown.

Table 3 shows how a FARQ t may be used to estimate the function F(s) for any input $s \in [0,1]^d$. That is, the tree may be recursively descended, keeping track of the region represented by the current sub-tree and recursing on the single child with a region containing point s.

TABLE 3

Estimating F(s) using FARQ t

```
FARQ-ESTIMATE(s, t, h)
1        ▷ Estimate F(s) using FARQ t (s ∈ h)
2        if t is a leaf node
3            return t
4        else
5            (h_c, t_c) ← choose child containing s
6            return FARQ-ESTIMATE(s, t_c, h_c)
```

FARQs can also be used to estimate combinations of two functions such as F and G. Let ⊙ be some operation (such as + or ×) defined on the domain of F and G. Then, H (s):= F (s)⊙G (s) can be estimated using FARQ $T_F$ for F and $T_G$ for G. Table 4 shows an example algorithm that generates a combined tree $T_F \odot T_G$ from the individual trees. The combination proceeds recursively to enumerate the region in both trees. If both trees have a leaf node for the same region, the output tree has a leaf node with the estimate formed using ⊙ to combine the individual estimates. Alternatively, if both trees have an internal node, both are processed recursively. In the final case, one of the trees has a leaf while the other has an internal node. In this case, the method may recurse on the internal node, simulating the $2^d$ children of the other tree using the estimate value from the leaf. In this case, the method results in an estimate for the entire region and estimates for each of the sub-regions may be required. Thus, in some cases, a SPLITESTIMATE function may be used to generate estimates for these child regions. For some FARQs, the implementation may simply copy the single estimate to each sub-region. In other cases, it might be required to divide the estimate by the number of generated sub-estimates. The implementation depends on the semantics of the functions approximated by the FARQs and the combining operation.

```
SPLITESTIMATE(t)
         ▷ Input: Leaf node t
         ▷ Output:⟨c_1, c_2, ... , c_2d⟩ estimates for 2^d children
         ▷ Implementation may be arbitrary; by default:
1            return⟨t, t, ... ,⟩
COMBINEFARQ(⊙, t_1, t_2)
         ▷ Input: Binary operator ⊙
         ▷ Input: FARQs t_1, t_2
         ▷ Estimate F_1(s) ⊙ F_2(s) using FARQs
1        if t_1, t_2 are both leaf nodes
2            return t_1 ⊙ t_2
3        else
4            if t_1 is an internal node
5                ▷ wlog, t_1 is internal
6                d_1 ← children of t_1
7            else
8                d_1 ← SplitEstimate(t_1)
9            if t_2 is an internal node
10               ▷ wlog, t_2 is internal
11               d_2 ← children of t_2
12           else
13               d_2 ← SplitEstimate(t_2)
14           for i ∈ [1,2^d]:
15               c_i ← CombineFARQ(⊙, d_1[i], d_2[i])
16           t ← SUBTREE(⟨c_1, c_2, ... , c_2d⟩)
```

Note that the tree generated by COMBINEFARQ (⊙, $t_1$, $t_2$) in Table 4 may not match the tree that would have been built for H (S) because the estimate is being combined instead of decomposing the original. In some cases, the FARQ approximations do not have enough information to reconstruct the original tree. One particular situation that we can address is that the generated tree may have too many internal nodes. After the ⊙ operation, a region associated with an internal node might be suitable for approximation using a single leaf. A MERGEFARQ algorithm (not shown) may be used to replace an internal node with a leaf after applying the ⊙ operation if there is no need to keep the decomposition.

As defined, the FARQ algorithm decomposes space until individual regions can be approximated adequately by a single estimate. The number of leaf nodes in the tree grows depending on the complexity of the function F and the error bound. Alternatively, a tree-building algorithm, according to some example embodiments, may be specified that chooses a decomposition with the minimum expected estimation error given a maximum number of leaf nodes.

Some example embodiments that employee the FARQ as discussed use the Morton block decomposition, with each step of FARQ decomposing into $2^d$ sub-blocks processed in Morton order. The Morton decomposition represents one approach that gives a feasible tessellation of the input space $[0,1]^d$ into a set R of disjoint regions r where a tessellation is feasible if the union of all r in R is $[0,1]^d$. As another example, a decomposition based on the Hilbert-Peano space filling curve can also provide a feasible decomposition. Another example is to perform the decomposition by Morton half-spaces where the dimension being decomposed cycles between the d parameter dimensions. This can be viewed as a kd-tree where the decomposition rule is restricted to half-spaces. Using half-space decompositions leads to taller, narrower trees that are generally smaller because decomposition can halt on a half-space that is adequately estimated by one value. Other methods for performing the decomposition may be apparent to those with skill in the art, and embodiments are not so limited.

The described approach is based on space-decomposition and does not base the decomposition boundaries on any decision related to the particular function F being approximated. This property makes it very efficient to combine two FARQs, because the CombineFARQ algorithm can directly match regions from the two decompositions.

As presented, each leaf node stores a single value Est(h) that is used as the estimate for any point s∈h. Instead, in some example embodiments, storing a model for each leaf node that could approximate the function more closely depending where s lies within h may be considered. For example, linear interpolation may be used, or, for better estimation, Gaussian processes, to build a model of the function within h and use it to estimate F (s). With an enhanced estimation model, more data may be needed at each leaf node to represent the model, but it is also expected that decomposition can stop sooner while providing the same error bound.

Applying FARQ Analysis to Load Balancing Optimizations

In some example embodiments, load balancing of a packing may be approximated using the FARQ data structures described above. In some example embodiments, the techniques described may also take into account the entire space of system parameters.

The following are a number of definitions used to describe load balancing predictions using FARQ analysis. Let $Q_T \in \mathbb{Q}_T$ be a query template. A query template is the text of a database language (e.g., SQL) statement that has zero or more explicit and implicit parameters. The explicit parameters appear as placeholders in the query text, and the implicit parameters represent the database state (e.g., contents of data, physical design, system state, or any suitable combination thereof). In the following, the system parameters are of primary interest so Parameters $(Q_T) = \langle S_N, S_S \rangle$ may be used to represent the explicit and implicit parameters, where $S_N$ are non-system parameters (e.g., explicit parameters, contents of data and so on) and $S_S$ are the system parameters such as those described in Table 1.

A query $q = \langle Q_T, A_N, A_S \rangle \in \mathbb{Q}$ is an instance of query template $Q_T$ with arguments $A_N$ bound to the $S_N$ parameters and $A_S$ bound to the system parameters $S_S$. Let $\phi_S$ be the set of all possible bindings of system parameters, so $A_S \delta \phi_S$. Let $\phi_N$ be the set of all bindings of non-system parameters so $A_N \in \phi_S$.

The load balancing techniques implemented by the optimization module 235 may be modeled as a function $\Omega: \mathbb{Q} \to \mathbb{L}$ where $\mathbb{L}$ is the set of query plans. A cost function $\Psi: \mathbb{L} \to \mathbb{K}$ may be defined that returns the optimization module's 235 estimated cost components for a plan $L \in \mathbb{L}$ as $K \in \mathbb{K}$, where K is a tuple with elements for the cost components such as response time, resource consumption, CPU cost, and so on as described above.

Therefore, a transformation may be used to group the non-system parameters $\phi_N$ into a set of representative example $\phi_N^o$. Let $\tau_T: \phi_N \to \phi_N^o$ be a mapping defined for query template $Q_T$ where $\tau_T(A_N) \to A_N^o$. The mapping $\tau_T$ may be designed so that $\Omega(\langle Q_T, \tau_T(A_N), A_S \rangle) = \Omega(\langle Q_T, A_N, A_S \rangle)$ for any $q = \langle Q_T, A_N, A_S \rangle \in \mathbb{Q}$.

In some example embodiments, the expression $\mathbb{Q}^o = \{\langle Q_T, A_N^o \rangle : Q_T \in \mathbb{Q} T, A_N^o \in \phi_N^o\}$ may be applied to approximating the cost of a query and the mapping $\tau(Q_T, A_N) \to (Q_T, \tau_T(A_N))$ may be used. $\mathbb{Q}^o$ may be defined as the set of archetype queries.

The non-system parameters of a query instance are not affected by the colocation of the database. A function $\Psi_S: \mathbb{Q}^o \times \phi_S \to \mathbb{K}$ may be defined. Given a particular archetype query $q^o \in \mathbb{Q}^o$ and system arguments $A_S \in \phi_S$, the $\Psi_S$ function estimates the cost using the underlying cost function $\Psi$. Based on these equations, the cost for a query or a set of queries may be estimated and implemented, for example, by software in the optimization module 235.

The system parameters described in Table 1 have varying impact on the query optimizer's plan selection and some parameters are not independent (e.g., Query Memory and Buffer Pool Size are closely related).

In order to use the FARQ representation for estimating the cost of the queries, an invertible mapping $N: \phi_S \to \Phi_S$ from system parameters to $\Phi_S = [0,1]^d$ may be used. This mapping can combine and scale parameters so that $d < |\phi_S|$. For example, in some embodiments N may be implemented according to the following algorithm described in Table 5.

TABLE 5

Example of normalizing system parameters to $[0, 1]^d$

NORMALIZE ($A_S$)
▷ Input: System parameters $A_S \in \phi_S$
▷ Output: $\rho = \langle \rho_{MR}, \rho_{MPL}, \rho_{MEM} \rangle \in \Phi_S = [0,1]^3$
▷ Let MR be the fraction of db pages in buffer pool
▷ Let MPL/MaxMPL be curr/max query multi-programming
▷ Let PF/MaxPF be curr/max allowed prefetch depth
▷ Let BPS/MaxBPS be curr/maximum buffer size for query
▷ Let QM/MaxQM be curr/maximum query memory
1 $\rho_{MR} \leftarrow$ MR 2 $\rho_{MPL} \leftarrow \dfrac{\text{MaxMPL} - \text{MPL}}{2 \times \text{MaxMPL}} + \dfrac{\text{PF}}{2\text{MaxPF}}$ 3 $\rho_{Mem} \leftarrow \dfrac{\text{BPS}}{2\text{MaxBPS}} + \dfrac{\text{QM}}{2\text{MaxQM}}$ 4 return $\langle \rho_{MR}, \rho_{MPL}, \rho_{MEM} \rangle$ Based on the above descriptions, a QCD can now be defined. Let $q^o \in \mathbb{Q}^o$ be an archetype query, and define function $\Psi_{q^o}: \Phi_S \to \mathbb{K}$ as the plan cost diagram function for archetype $q^o$ where $\Psi_{q^o}(\sigma) = \Psi_S(q^o, N^{-1}(\sigma))$.

In some example embodiments, a FARQ $T_{q^o}$ for $\Psi_{q^o}$ may be built, where $T_{q^o}$ represents the plan cost diagram for archetype query $q^o$. The plan cost diagram is a d-dimensional quadtree where each region represents a space of system parameters with the estimated cost for query $q^o$ in that region. Due to the property of transformation $\tau$, this estimate is also useable for any other query $q \in \mathbb{Q} : \tau(q) = q^o$.

As discussed above with reference to FIG. 3, the WMT 305 may retrieve a QCD 310 for a query $Q_j$ if the query has been previously observed. In some example embodiments, this is performed using $\tau(q_{ij})$ to determine if the archetype query for each query in the current mix $M_i$ was previously observed.

In some example embodiments, the behavior of a mix of databases can be predicted by classifying the databases according to their observed resource demands and then predicting from previous observations of a server running a mix of databases with the same classifications. In this case, estimates of cost by the optimization module 235 may be used, rather than observed resource demands. For each query q, there may be an associated query cost diagram for the query's archetype $q^0=\tau(q)$. The WMT 305 may periodically observe samples $M_i = \langle q_{i1}, q_{i2}, \ldots, q_{in} \rangle$. The query cost diagrams for the queries in the sample may be merged into a single Mix Cost Diagram (MCD) using the COMBINE-FARQ algorithm so that each region in the system parameter space has a multi-set $\langle K_{i1}, K_{i2}, \ldots, K_{in} \rangle$ that are the estimated costs $K_{ij}$ from the QCD for query $q_{ij}$ in that region of the system parameter space.

A cost classifier function $\mathcal{K}: \mathbb{K}^+ \to \mathcal{C}$ may be used to classify the multiset of costs to one of a small set of cost classes $\mathcal{C}$ (e.g., 24 classes). Given a multiset of queries and a proposed system configuration, the MCD provides estimated costs for each of the queries in the multiset. The cost classifier function gives a single label for this multiset of estimates. For example, the classifier could map an input multiset of ten queries with estimated CPU cost of 5 seconds and I/O of 2 seconds to a class label of "Disk-Low, CPU-Medium".

The COMBINEFARQ algorithm can be used to compose the cost classifier function with the MCD to give a new FARQ, the mix class diagram (MLD). The MLD estimates the cost class for query mix M for each region of the system parameter space. The MLD may be used to estimate the cost class for the database in any system configuration when running the sampled mix of queries Information for query mix samples may be combined by keeping the distinct MLDs that have been observed as samples along with the count of the observations for each MLD. Each database has a set of MLDs with an associated frequency for each one. This is the MLD distribution (MLDD) for the database.

When considering the databases $P_D = \{D_1, D_2, \ldots, D_N\}$ in a packing P, the MLDD may be used for each database to generate a single combined FARQ $T_P$ where each region is a multi-set of $\mathcal{C}$ cost class labels. We use $\mathcal{L} \in \mathbb{N}^{|\mathcal{C}|}$ to represent this multiset by the count of databases with each class label. This FARQ $T_P$ predicts how many of the N databases will have each of the $\mathcal{C}$ cost class labels for any system configuration. Thus, $T_P$ may be determined for $P_D$, without dependence on $P_H$. This FARQ $T_P$ may have different labels in different regions of the system parameter space, and reflects the adaptivity of the combination of databases $P_D$.

Different hosts will have varying distributions of system parameters, and we use a FARQ $T_H$ for each host with each region containing the probability p of the host being in that region. Thus, for each packing P, $T_H$ may be determined with reference to $P_H$ and without dependence on $P_D$.

The $T_P$ and $T_H$ for packing P may be combined as follows. For each region in the system parameter space represented by a hypercube in $T_P$, generate $\langle p, \mathcal{L} \rangle$ where p is the probability of the host being in the configuration and $\mathcal{L}$ is the multiset of cost class labels from $T_P$. These generated pairs predict how often a packing P would have the given multiset of cost labels.

As discussed above with respect to FIG. 2, the objectives module 225 provides information about the Service Level Objectives (SLOs). In some example embodiments, the objectives module 225 can determine whether a particular multiset of cost labels $\mathcal{L}$ meets the objectives. If $\mathcal{L}$ is predicted to violate the objectives, then this is called bad. If it meets the criteria but the host resources are under-utilized, this is called under; otherwise, it is called good. Given the pairs $\langle p, \mathcal{L} \rangle$, combined into a multiset R, the Objective Module 225 may use this to assign a goodness metric to the packing overall. This implements the desired packing-goodness function $\mathcal{G}: \mathbb{P} \to \mathbb{G}$ that estimates the goodness of a proposed packing $P \in \mathbb{P}$. Table 6, below, demonstrates an example method for estimating the goodness of a proposed packing

TABLE 6

Example of estimating goodness of a packing

| | ESTIMATEGOODNESS(P) |
|---|---|
| | ▷ Estimate goodness packing $P \in \mathbb{P}$ |
| | ▷ Returns a value in $\mathbb{G}$ = { good, bad, under}. |
| 1 | Retrieve $T_H$ for $P_H$ |
| 2 | $T_P \leftarrow$ empty |
| 3 | foreach $d \in P_D$ |
| 4 |     Combine $T_P$ with MLDD of d |
| 5 | $R \leftarrow$ empty |
| 6 | foreach $(h, \mathcal{L}) \in T_P$ |
| 7 |     $p \leftarrow T_H[h]$ |
| 8 |     $R \leftarrow R \uplus \mathcal{L}$ |
| 9 | ▷ Use Objectives Module 225 to characterize R as { good, bad, under}. |
| 10 | return OBJECTIVEMODULE( R ) |

Figure 6:
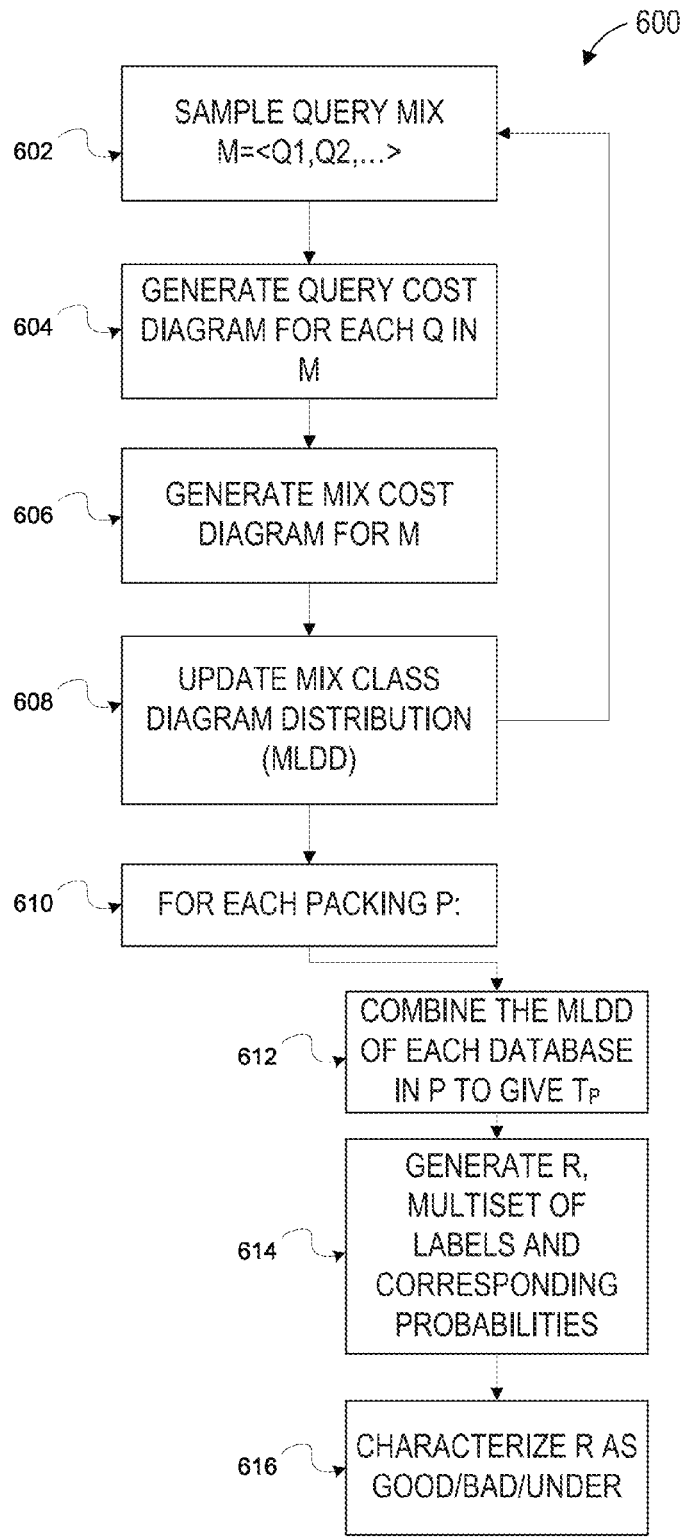
FIG. 6 is a flowchart illustrating an example method for load balancing databases in a cloud server environment.

FIG. 6 is a flowchart illustrating an example method 600 for load balancing databases in a cloud server environment. The method 600 may be viewed from the perspective of a network-based system in a cloud environment, such as network-based system 105. In some example embodiments, a server, such as server 120, may be configured to perform the example method 600.

In operations 602-608 the system characterizes a mix of queries that are typically executed for each database in the cloud environment. In some example embodiments, the WMT 305 module is configured to perform the operations 602-608. In operation 602, the system periodically samples the queries executing for each database within the cloud environment. Each sample of queries, called a mix M, consists of a multiset of queries. In operation 604, for every query Q in a mix M, the system accesses system configuration parameters that fully characterize the adaptive behavior of the database system. These system parameters are used in conjunction with the database query optimizer to generate a query cost diagram (QCD) and store it.

In operation 606, the system generates a mix cost diagram (MCD). The system, in operation 608, uses a cost classification module to update a mix label diagram distribution (MLDD) and store the updated MLDD. At the end of operation 608, the stored MLDD characterizes the work needed for each database in the cloud environment. The operations 602-608 may be repeated to gather additional data regarding the performance of the database. For example, changes in the MLDD after each iteration may be measured and the MLDD used only once the rate of change falls below a predefined threshold. As another example, data may be gathered for a certain number of mixes, a certain period of time, or until another metric is satisfied.

In operation 610, a loop is begun to consider each packing P. Accordingly, operations 612-614 are repeated for each candidate packing P of databases for a particular host. In an example embodiment, these steps are performed by the EstimateGoodness algorithm of Table 6. In operation 612, the system considers the databases in the proposed packing P and uses the stored MLDD from operation 608 to generate an approximation $T_P$ that characterizes the cost labels for the databases, $P_D$, in the proposed packing P. In operation 614, the system accesses a stored frequency distribution of system state $T_H$ for the host $P_H$ of the proposed packing P, and combines $T_H$ with $T_P$ to generate R, a multiset of (P, L) pairs in which L is a multiset of cost labels and P is the corresponding probability of L. In operation 616, the multiset R is combined with information from an objectives module in order to characterize the proposed packing P as either good, bad, or under.

Figure 7:
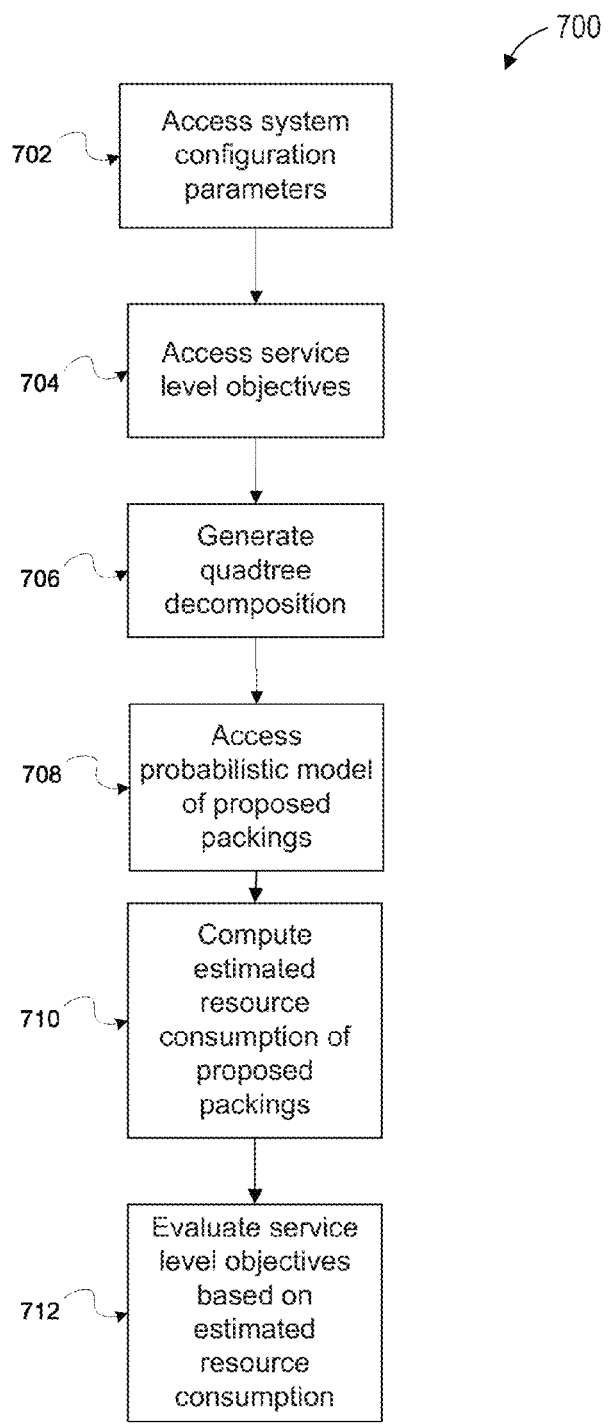
FIG. 7 is a flowchart illustrating an example method for load balancing databases in a cloud server environment.

FIG. 7 is a flowchart illustrating an example method 700 for load balancing databases in a cloud server environment. The method 700 may be viewed from the perspective of a network-based system in a cloud environment, such as network-based system 105. In some example embodiments, a server, such as server 120, may be configured to perform the example method 700. In some cases, more specifically, a workload model training module 305 may be configured to perform the example method 700.

At operation 702, the network-based system 105 may access system configuration parameters. Examples of the system configuration parameters can include the parameters described in relation to FIG. 3, such as query memory, available buffer pool size, and prefetch length. The system parameters may be stored in the storage module 220 and may be accessible by the resources module 230, for example. The system parameters may specify quantitatively the capabilities of the server 120, which therefore can represent a sort of outer boundary or constraint when estimating resource costs of one or more queries to one or more databases.

The network-based system 105 may also access SLOs, at operation 704. The SLOs may specify additional qualifications for determining when a packing of databases is satisfactory. In some example embodiments, the SLOs may be stored in the storage module 220 and may be accessed by the objectives module 225.

At operation 706, the network-based system 105 may generate a quadtree decomposition based on the system parameters. In some example embodiments, the system parameters may be normalized, e.g., fit to arrange from [0, 1), consistent with the above descriptions. If normalized, the system parameters can be described by a quadtree decomposition of a square or hypercube of d dimensions, where d is equal to the number of system parameters. The quadtree decomposition may model the cost estimates of a database query, expressed as a function F, and may determine the cost estimates of the function F at each point within the normalized space of the system parameters. Example algorithms for performing the quadtree decomposition on the system parameters applied to a database query may be consistent with the descriptions for quadtree decomposition and FARQ analysis described above. Ultimately, each block in the quadtree will have a single cost estimate using the analysis described above. The decomposition is such that each block is expected to estimate actual query resource demands with a desired error level.

A probabilistic model of proposed packings may then be accessed, at operation 708. In some example embodiments, the probabilistic model may include one or more different factors: a) concurrent queries across all databases in the proposed packing and/or b) expected system configurations on the server 120 with the proposed packing. The probabilistic model may be stored in the storage module 220, and in some cases may be generated by the optimization module 235.

At operation 710, the network-based system 105 may compute an estimated resource consumption of the proposed packings from the probabilistic model accessed in operation 708. The estimated resource consumption may be based on the quadtree decomposition that may be used to estimate the actual query resource demands. The estimated resource consumption may be computed by the optimization module 235, in some example embodiments.

After having generated the estimated resource consumption of a proposed packing, the service level objectives may be evaluated, at operation 712. It can be determined whether the proposed packings satisfy the service level objectives. If they do not, then the proposed packing may be declared invalid. If a proposed packing does satisfy the service level objectives, then the proposed packing may be an acceptable measure of load balancing. This valuation operation may be performed by the optimization module 235, in some example embodiments.

Figure 8:
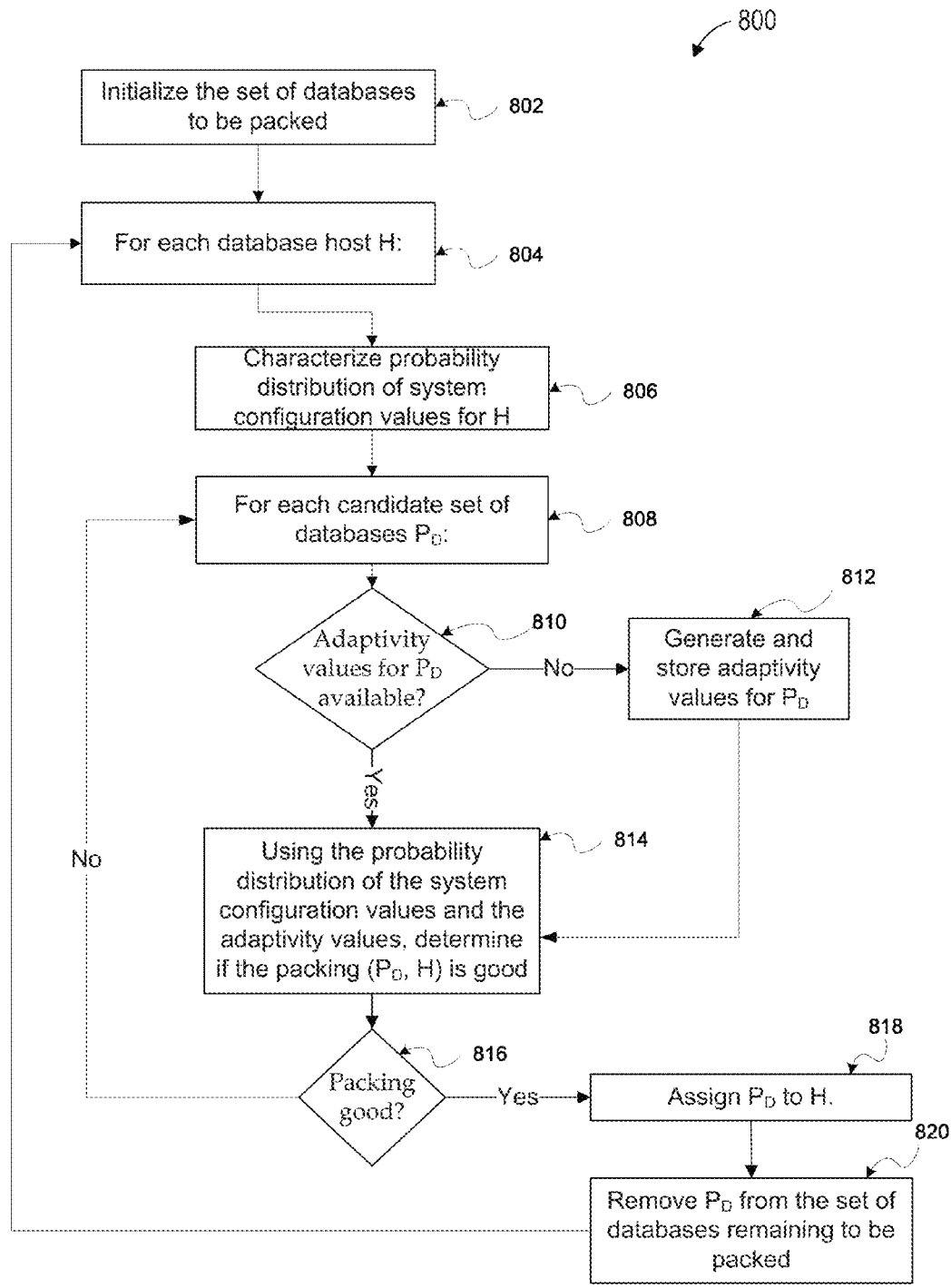
FIG. 8 is a flowchart illustrating an example method for load balancing databases in a cloud server environment.

FIG. 8 is a flowchart illustrating an example process 800 for load balancing databases in a cloud server environment. The process 800 may be viewed from the perspective of a network-based system in a cloud environment, such as network-based system 105. In some example embodiments, a server, such as server 120, may be configured to perform the example method 800. In some cases, more specifically, a workload model training module 305 may be configured to perform the example process 800.

In operation 802, a set of databases to be packed is initialized. For example, in a database management system (DBMS), a central controller may have control over a number hosts, each of which may be assigned a set of databases to host. In some example embodiments, the set of databases to be packed using the process 800 is initialized to include all databases under the control of the DBMS. In other example embodiments, some assignments of databases to hosts are fixed prior to the running of the process 800 and the fixed databases are not included in the set of databases to be packed.

A loop over all available hosts is begun in operation 804. Accordingly, the operations 806-820 may be executed repeatedly, for each host H to which databases may be assigned.

A set of possible system configuration values for the host H is created in operation 806 and the probability distribution of the possible system configuration values is characterized. For example, the $T_H$ FARQ discussed above with respect to FIG. 6 may be generated for the host H.

In operation 808, a loop over all candidate sets of databases is begun. Thus, the operations 810-820 may be executed repeatedly, for each candidate set of databases $P_D$.

A check to determine if the adaptivity values for the candidate set of databases $P_D$ have already been generated is made in operation 810. If the adaptivity values have already been generated, they can be retrieved from storage and processing can continue with operation 814. If the adaptivity values have not already been generated, they are generated and stored in operation 812. For example, the $T_P$ FARQ discussed above with respect to FIG. 6 may be generated for the candidate set of databases $P_D$.

In operation 814, the system configuration values and the adaptivity values are used to determine if the packing of the databases in $P_D$ on the host H is a good packing. For example, EstimateGoodness function of Table 6 may be used to determine if the proposed packing ($P_D$, H) is good. If the packing is not good, another candidate set of databases is considered and the process continues with a new candidate set of databases $P_D$ in operation 808. In some example embodiments, if the loop over all candidate sets of databases $P_D$ completes without finding a good packing for H, the host H is not used. In other example embodiments, a packing that underutilizes H but meets the SLOs is used.

If the packing considered in operation 814 is good, then the databases in the packing are assigned to the host (operation 818), and those databases are removed from the set of databases remaining to be packed (operation 820). The loop over the set of candidate databases for the host H is terminated, and the process continues with the next host H in operation 804. If databases remain in the set of databases to be packed after the loop over all available hosts is complete, an error message to an administrator may be generated, unassigned databases may be randomly or evenly assigned to hosts, databases may remain unassigned, SLOs may be reduced by a factor and the process 800 run again, hosts may be added, or any suitable combination thereof. If hosts remain after all databases are assigned, an informational message to an administrator may be generated, SLOs may be increased by a factor and the process 800 run again, hosts may be freed for other uses, or any suitable combination thereof.

Figure 9:
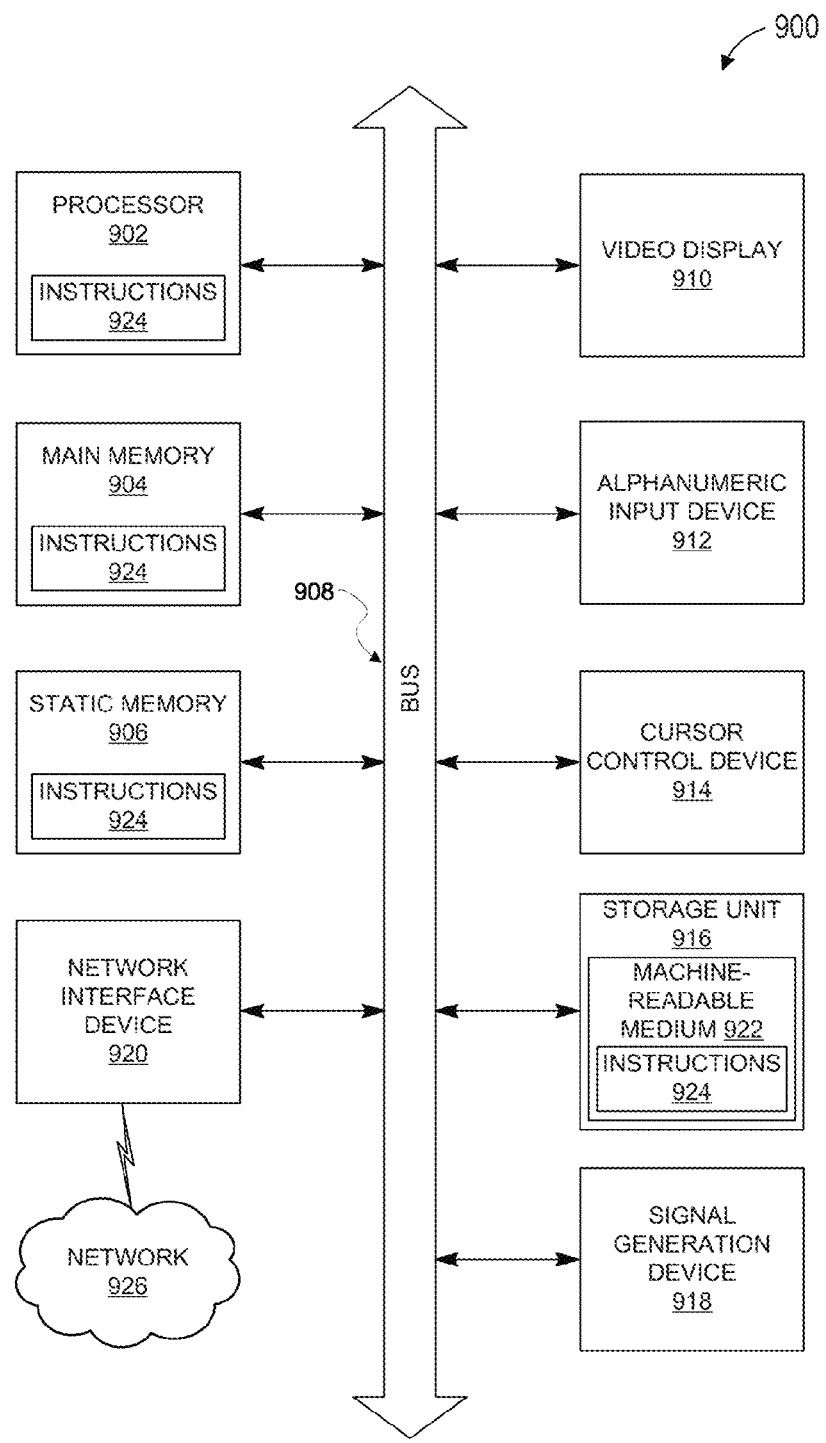
FIG. 9 is a block diagram illustrating components of a machine, according to some example embodiments, able to read instructions from a machine-readable medium and perform any one or more of the methodologies discussed herein.

FIG. 9 is a block diagram illustrating components of a machine 900, according to some example embodiments, able to read instructions 924 from a machine-readable medium 922 (e.g., a non-transitory machine-readable medium, a machine-readable storage medium, a computer-readable storage medium, or any suitable combination thereof) and perform any one or more of the methodologies discussed herein, in whole or in part. Specifically, FIG. 9 shows the machine 900 in the example form of a computer system (e.g., a computer) within which the instructions 924 (e.g., software, a program, an application, an applet, an app, or other executable code) for causing the machine 900 to perform any one or more of the methodologies discussed herein may be executed, in whole or in part.

In alternative embodiments, the machine 900 operates as a standalone device or may be connected (e.g., networked) to other machines. In a networked deployment, the machine 900 may operate in the capacity of a server machine or a client machine in a server-client network environment, or as a peer machine in a distributed (e.g., peer-to-peer) network environment. The machine 900 may include hardware, software, or combinations thereof, and may as examples be a server computer, a client computer, a personal computer (PC), a tablet computer, a laptop computer, a netbook, a cellular telephone, a smartphone, a set-top-box (STB), a personal digital assistant (PDA), a web appliance, a network router, a network switch, a network bridge, or any machine capable of executing the instructions 924, sequentially or otherwise, that specify actions to be taken by that machine. Further, while only a single machine 900 is illustrated, the term "machine" shall also be taken to include any collection of machines 900 that individually or jointly execute the instructions 924 to perform all or part of any one or more of the methodologies discussed herein.

The machine 900 includes a processor 902 (e.g., a CPU, a graphics processing unit (GPU), a digital signal processor (DSP), an application specific integrated circuit (ASIC), a radio-frequency integrated circuit (RFIC), or any suitable combination thereof), a main memory 904, and a static memory 906, which are configured to communicate with each other via a bus 908. The processor 902 may contain microcircuits that are configurable, temporarily or permanently, by some or all of the instructions 924, such that the processor 902 is configurable to perform any one or more of the methodologies described herein, in whole or in part. For example, a set of one or more microcircuits of the processor 902 may be configurable to execute one or more modules (e.g., software modules) described herein.

The machine 900 may further include a video display 910 (e.g., a plasma display panel (PDP), a light emitting diode (LED) display, a liquid crystal display (LCD), a projector, a cathode ray tube (CRT), or any other display capable of displaying graphics or video). The machine 900 may also include an alphanumeric input device 912 (e.g., a keyboard or keypad), a cursor control device 914 (e.g., a mouse, a touchpad, a trackball, a joystick, a motion sensor, an eye tracking device, or other pointing instrument), a storage unit 916, a signal generation device 918 (e.g., a sound card, an amplifier, a speaker, a headphone jack, or any suitable combination thereof), and a network interface device 920.

The storage unit 916 includes the machine-readable medium 922 (e.g., a tangible and non-transitory machine-readable storage medium) on which are stored the instructions 924 embodying any one or more of the methodologies or functions described herein, including, for example, any of the descriptions of FIGS. 1-7. The instructions 924 may also reside, completely or at least partially, within the main memory 904, within the processor 902 (e.g., within the processor's cache memory), or both, before or during execution thereof by the machine 900. The instructions 924 may also reside in the static memory 906.

Accordingly, the main memory 904 and the processor 902 may be considered machine-readable media 922 (e.g., tangible and non-transitory machine-readable media). The instructions 924 may be transmitted or received over a network 926 via the network interface device 920. For example, the network interface device 920 may communicate the instructions 924 using any one or more transfer protocols (e.g., HyperText Transfer Protocol (HTTP)). The machine 900 may also represent example means for performing any of the functions described herein, including the processes described in any of FIGS. 1-7.

In some example embodiments, the machine 900 may be a portable computing device, such as a smart phone or tablet computer, and have one or more additional input components (e.g., sensors or gauges), not shown. Examples of such input components include an image input component (e.g., one or more cameras), an audio input component (e.g., a microphone), a direction input component (e.g., a compass), a location input component (e.g., a GPS receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium 922 able to store data temporarily or permanently and may be taken to include, but not be limited to, random access memory (RAM), read-only memory (ROM), buffer memory, flash memory, and cache memory. While the machine-readable medium 922 is shown in an example embodiment to be a single medium, the term "machine-readable medium" should be taken to include a single medium or multiple media (e.g., a centralized or distributed database, or associated caches and servers) able to store instructions 924. The term "machine-readable medium" shall also be taken to include any medium, or combination of multiple media, that is capable of storing the instructions 924 for execution by the machine 900, such that the instructions 924, when executed by one or more processors of the machine 900 (e.g., processor 902), cause the machine 900 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Furthermore, the machine-readable medium is non-transitory in that it does not embody a propagating signal. However, labeling the tangible machine-readable medium as "non-transitory" should not be construed to mean that the medium is incapable of movement; the medium should be considered as being transportable from one physical location to another. Additionally, since the machine-readable medium is tangible, the medium may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute hardware modules. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors 902) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure one or more processors 902, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 902 that are temporarily configured (e.g., by software) or permanently configured to perform the relevant operations. Whether temporarily or permanently configured, such processors 902 may constitute processor-implemented modules that operate to perform one or more operations or functions described herein. As used herein, "processor-implemented module" refers to a hardware module implemented using one or more processors 902.

Similarly, the methods described herein may be at least partially processor-implemented, with a processor 902 being an example of hardware. For example, at least some of the operations of a method may be performed by one or more processors 902 or processor-implemented modules. As used herein, "processor-implemented module" refers to a hardware module in which the hardware includes one or more processors 902. Moreover, the one or more processors 902 may also operate to support performance of the relevant operations in a "cloud computing" environment or as a "software as a service" (SaaS). For example, at least some of the operations may be performed by a group of computers (as examples of machines 900 including processors), with these operations being accessible via a network 926 (e.g., the Internet) and via one or more appropriate interfaces (e.g., an application program interface (API)).

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine 900. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine 900 (e.g., a computer) that manipulates or transforms data represented as physical (e.g., electronic, magnetic, or optical) quantities within one or more memories (e.g., volatile memory, nonvolatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
accessing, by a server in a network-based system, performance characteristics of each query of a query mix of a database;
generating, by the server, a query quadtree decomposition for each query of the query mix, the quadtree decomposition for said query being based on the performance characteristics of said query, the quadtree decomposition for said query modeling a cost estimate of said query as a function of one or more system configuration parameters;
generating, by the server, a mix quadtree decomposition for the query mix based on the quadtree decompositions for each query of the query mix, the mix quadtree decomposition modeling a multi-set of cost estimates of the set of queries when executed concurrently as a function of the one or more system configuration parameters; and
generating a cost quadtree decomposition based on a cost classification function and the mix quadtree decomposition, the cost quadtree decomposition modeling a distribution of a cost-class label for the query mix as a function of the one or more system configuration parameters.

2. The method of claim 1, wherein:
the query mix is one of a set of query mixes;
the cost quadtree decomposition is one of a set of cost quadtrees, each cost quadtree of the set of cost quadtrees corresponding to a query mix of the set of query mixes; and
the method further comprises:
accessing a recorded frequency distribution of the set of query mixes for a database; and
generating a database quadtree decomposition based on the recorded frequency distribution and the set of mix quadtrees, the database quadtree decomposition modeling a distribution of cost-class label for the database as a function of the one or more system configuration parameters.

3. The method of claim 2, wherein:
the database is one of a set of databases;
the database quadtree decomposition is one of a set of database quadtree decompositions, each database quadtree of the set of database quadtrees corresponding to a database of the set of databases; and
the method further comprises:
generating, by the server, a packing quadtree decomposition based on the set of database quadtrees, the packing quadtree decomposition modeling a multiset of cost-class label for the set of databases as a function of the performance capabilities of the one or more system configuration parameters to a multiset of class labels, the multiset representing the estimated labels for the databases in the set of databases.

4. The method of claim 3, further comprising:
generating, by the server, a host quadtree decomposition based on a probability distribution of the system configuration parameters for the host, the host being a server capable of running one or more databases of the set of databases.

5. The method of claim 4, further comprising:
determining, based on the host quadtree decomposition and the packing quadtree decomposition, a fitness level of running the set of databases on the host.

6. The method of claim 5, further comprising: comparing the fitness level to
one or more service level objectives; and
based on the fitness level not satisfying the one or more service level objectives, not assigning the set of databases to the host.

7. The method of claim 5, further comprising:
comparing the fitness level to one or more service level objectives; and
based on the fitness level satisfying the one or more service level objectives, assigning the set of databases to the host.

8. The method of claim 1, further comprising:
normalizing the one or more system configuration parameters to a unit hypercube with dimension equal to a count of the one or more system configuration parameters; and wherein
the generating of the mix quadtree decomposition is based further on the normalization of the one or more system configuration parameters.

9. The method of claim 1, wherein the one or more system configuration parameters includes query memory, available buffer pool size, query multi-programming level, prefetch length, buffer pool contents, central processing unit (CPU) cost of operations, or disk transfer time.

10. A system comprising:
a database; and
an optimization module configured to:
access performance characteristics of each query of a query mix of the database;
generate a query quadtree decomposition for each query of the query mix, the quadtree decomposition for said query being based on the performance characteristics of said query, the quadtree decomposition for said query modeling a cost estimate of said query as a function of one or more system configuration parameters;

generate a mix quadtree decomposition for the query mix based on the quadtree decompositions for each query of the query mix, the mix quadtree decomposition modeling a multi-set of cost estimates of the set of queries when executed concurrently as a function of the one or more system configuration parameters; and generate a cost quadtree decomposition based on a cost classification function and the mix quadtree decomposition, the cost quadtree decomposition modeling a distribution of a cost-class label for the query mix as a function of the one or more system configuration parameters.

11. The system of claim 10, wherein:

the query mix is one of a set of query mixes;

the cost quadtree decomposition is one of a set of cost quadtrees, each cost quadtree of the set of cost quadtrees corresponding to a query mix of the set of query mixes; and the optimization module is further configured to:

access a recorded frequency distribution of the set of query mixes for a database; and generate a database quadtree decomposition based on the recorded frequency distribution and the set of mix quadtrees, the database quadtree decomposition modeling a distribution of cost-class label for the database as a function of the one or more system configuration parameters.

12. The system of claim 11, wherein:

the database is one of a set of databases;

the database quadtree decomposition is one of a set of database quadtree decompositions, each database quadtree of the set of database quadtrees corresponding to a database of the set of databases; and the optimization module is further configured to:

generate a packing quadtree decomposition based on the set of database quadtrees, the packing quadtree decomposition modeling a multiset of cost-class label for the set of databases as a function of the performance capabilities of the one or more system configuration parameters to a multiset of class labels, the multiset representing the estimated labels for the databases in the set of databases.

13. The system of claim 12, wherein the optimization module is further configured to:

generate a host quadtree decomposition based on a probability distribution of the system configuration parameters for the host, the host being a server capable of running one or more databases of the set of databases.

14. The system of claim 13, wherein the optimization module is further configured to:

determine, based on the host quadtree decomposition and the packing quadtree decomposition, a fitness level of running the set of databases on the host.

15. The system of claim 14, wherein the optimization module is further configured to:

compare the fitness level to one or more service level objectives; and based on the fitness level not satisfying the one or more service level objectives, not assign the set of databases to the host.

16. The system of claim 14, wherein the optimization module is further configured to:

compare the fitness level to one or more service level objectives; and based on the fitness level satisfying the one or more service level objectives, assign the set of databases to the host.

17. The system of claim 10, wherein the optimization module is further configured to:

normalize the one or more system configuration parameters to a unit hypercube with dimension equal to a count of the one or more system configuration parameters; and wherein the generating of the mix quadtree decomposition is based further on the normalization of the one or more system configuration parameters.

18. The system of claim 10, wherein the one or more system configuration parameters includes query memory, available buffer pool size, query multi-programming level, prefetch length, buffer pool contents, central processing unit (CPU) cost of operations, or disk transfer time.

* * * * *